(12) United States Patent
Klenoff et al.

(10) Patent No.: US 10,748,139 B2
(45) Date of Patent: Aug. 18, 2020

(54) METHOD AND SYSTEM FOR INTELLIGENT ROUTING FOR ELECTRONIC WALLET REGISTRATION AND USAGE

(71) Applicant: Mastercard International Incorporated, Purchase, NY (US)

(72) Inventors: Nili Klenoff, White Plains, NY (US); Shane Travers Munie, O'Fallon, MO (US); Todd Healy, Brooklyn, NY (US); David Lim, New York, NY (US); Igor Faybyshev, Mountainside, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 322 days.

(21) Appl. No.: 15/614,824

(22) Filed: Jun. 6, 2017

(65) Prior Publication Data

US 2017/0352024 A1 Dec. 7, 2017

Related U.S. Application Data

(60) Provisional application No. 62/346,107, filed on Jun. 6, 2016.

(51) Int. Cl.
*G06Q 20/36* (2012.01)
*G06F 16/23* (2019.01)
(Continued)

(52) U.S. Cl.
CPC .......... *G06Q 20/363* (2013.01); *G06F 16/23* (2019.01); *G06F 16/288* (2019.01); *G06F 16/43* (2019.01); *G06Q 20/36* (2013.01); *G06Q 50/00* (2013.01)

(58) Field of Classification Search
CPC .................................................. G06Q 20/363
(Continued)

(56) References Cited

U.S. PATENT DOCUMENTS

2012/0011063 A1 1/2012 Killian
2015/0046339 A1* 2/2015 Wong ................... G06Q 20/382
705/71

(Continued)

OTHER PUBLICATIONS

Lowry, What's in Your Mobile Wallet? An Analysis of Trends in Mobile Payments and Regulation, 2016, Federal Communications Law Journal, vol. 68, Iss 2 (Year: 2016).*

(Continued)

*Primary Examiner* — Jessica Lemieux
(74) *Attorney, Agent, or Firm* — Buchanan Ingersoll & Rooney PC (57) ABSTRACT

A method for intelligent routing for electronic wallet registration includes: storing, in a wallet database of a processing server, a plurality of wallet profiles, wherein each wallet profile includes a structured data set related to at least one electronic wallet including at least one or more wallet identifiers and one or more identification numbers; receiving, by a receiving device of the processing server, a wallet request from a computing device, wherein the wallet request includes at least a primary account number; executing, by a querying module of the processing server, a query on the wallet database to identify a specific wallet profile where one of the included one or more identification numbers corresponds to the primary account number; electronically transmitting, by a transmitting device of the processing server, at least one of the one or more wallet identifiers included in the identified specific wallet profile to the computing device.

24 Claims, 7 Drawing Sheets

(51) Int. Cl.
*G06F 16/43* (2019.01)
*G06F 16/28* (2019.01)
*G06Q 50/00* (2012.01)

(58) Field of Classification Search
USPC .......................................................... 705/39
See application file for complete search history.

(56) References Cited

U.S. PATENT DOCUMENTS

2015/0073982 A1* 3/2015 Prabhu ................... G06Q 20/36
705/41
2016/0071074 A1* 3/2016 Baird ................... G06Q 20/102
705/40

OTHER PUBLICATIONS

International Search Report and Written Opinion issued by the International Search Authority dated Aug. 16, 2017 in corresponding PCT Application No. PCT/US2017/035881 (13 pages).

* cited by examiner

METHOD AND SYSTEM FOR INTELLIGENT ROUTING FOR ELECTRONIC WALLET REGISTRATION AND USAGE

FIELD

The present disclosure relates to intelligent routing for registration and usage of electronic wallets, specifically the use of data linkages to enable intelligent routing for selection of electronic wallets during registration and usage of applicable electronic wallets in a network of wallets.

BACKGROUND

As the technology surrounding computing devices increases, consumers have grown accustomed to using them more and more as part of their daily lives. As part of this increased usage of computing devices, electronic wallets have been developed to enable computing devices to store and transmit payment credentials for transaction accounts for use in payment transactions. To capitalize on this capability, a number of electronic wallets have been developed. In some cases, a plurality of different electronic wallets may be managed or otherwise associated with a single entity for the registration and usage of the plurality of wallets.

However, such configurations may be inconvenient for users. For example, if there are two dozen electronic wallets being managed by a single entity, a new user may be forced to select one of the twenty-four potential electronic wallets during the registration process. In such cases, the user may have a transaction account with a related financial institution, but be unaware of the electronic wallets that are able to use with their transaction account. As a result, many users may abandon the process when registering for the use of an electronic wallet. Furthermore, such problems may persist during usage of the electronic wallet.

For example, when a user is initiating a payment transaction, they may have to select an electronic wallet for usage. With electronic wallets that are grouped together, the user may again be presented with an overwhelming number of electronic wallets to choose from for use in paying for the payment transaction. The user may forget what electronic wallets they are registered with, which may make the selection process inconvenient and frustrating, enough that the user may elect to use an alternative payment method.

Thus, there is a need for a technical solution to enable the intelligent routing of a user during registration and usage of an electronic wallet, where the intelligent routing may automatically route the user to a correct electronic wallet when faced with a group of electronic wallets. Such a technological solution may solve the problems of existing registration and usage of electronic wallets by aiding the registration and usage processes with minimal interaction by the user.

SUMMARY

The present disclosure provides a description of systems and methods for intelligent routing for electronic wallet registration and selection. Intelligent routing for the registration and selection of electronic wallets for usage may enable a user to be intelligently provided with associated and suitable electronic wallets during the registration and selection processes. As a result, the methods and systems discussed herein may provide users with greater convenience and ease of use regarding the registration and selection of electronic wallets for use in payment transactions.

A method for intelligent routing for electronic wallet registration includes: storing, in a wallet database of a processing server, a plurality of wallet profiles, wherein each wallet profile includes a structured data set related to at least one electronic wallet including at least one or more wallet identifiers and one or more identification numbers; receiving, by a receiving device of the processing server, a wallet request from a computing device, wherein the wallet request includes at least a primary account number; executing, by a querying module of the processing server, a query on the wallet database to identify a specific wallet profile where one of the included one or more identification numbers corresponds to the primary account number; electronically transmitting, by a transmitting device of the processing server, at least one of the one or more wallet identifiers included in the identified specific wallet profile to the computing device.

A method for intelligent routing for electronic wallet selection includes: storing, in an account database of a processing server, a plurality of account profiles, wherein each account profile includes a structured data set related to a user account including at least one or more wallet identifiers and an account identifier; receiving, by a receiving device of the processing server, a wallet request from a computing device, wherein the wallet request includes at least a specific account identifier; executing, by a querying module of the processing server, a query on the account database to identify a specific account profile where the included account identifier corresponds to the specific account identifier; electronically transmitting, by a transmitting device of the processing server, at least one of the one or more wallet identifiers included in the identified specific account profile to the computing device.

A system for intelligent routing for electronic wallet registration includes: a wallet database of a processing server configured to store a plurality of wallet profiles, wherein each wallet profile includes a structured data set related to at least one electronic wallet including at least one or more wallet identifiers and one or more identification numbers; a receiving device of the processing server configured to receive a wallet request from a computing device, wherein the wallet request includes at least a primary account number; a querying module of the processing server configured to execute a query on the wallet database to identify a specific wallet profile where one of the included one or more identification numbers corresponds to the primary account number; and a transmitting device of the processing server configured to electronically transmit, at least one of the one or more wallet identifiers included in the identified specific wallet profile to the computing device.

A system for intelligent routing for electronic wallet selection includes: an account database of a processing server configured to store a plurality of account profiles, wherein each account profile includes a structured data set related to a user account including at least one or more wallet identifiers and an account identifier; a receiving device of the processing server configured to receive a wallet request from a computing device, wherein the wallet request includes at least a specific account identifier; a querying module of the processing server configured to execute a query on the account database to identify a specific account profile where the included account identifier corresponds to the specific account identifier; a transmitting device of the processing server configured to electronically transmit at least one of the one or more wallet identifiers included in the identified specific account profile to the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Intelligent Routing for Electronic Wallet Registration and Selection

Figure 1:
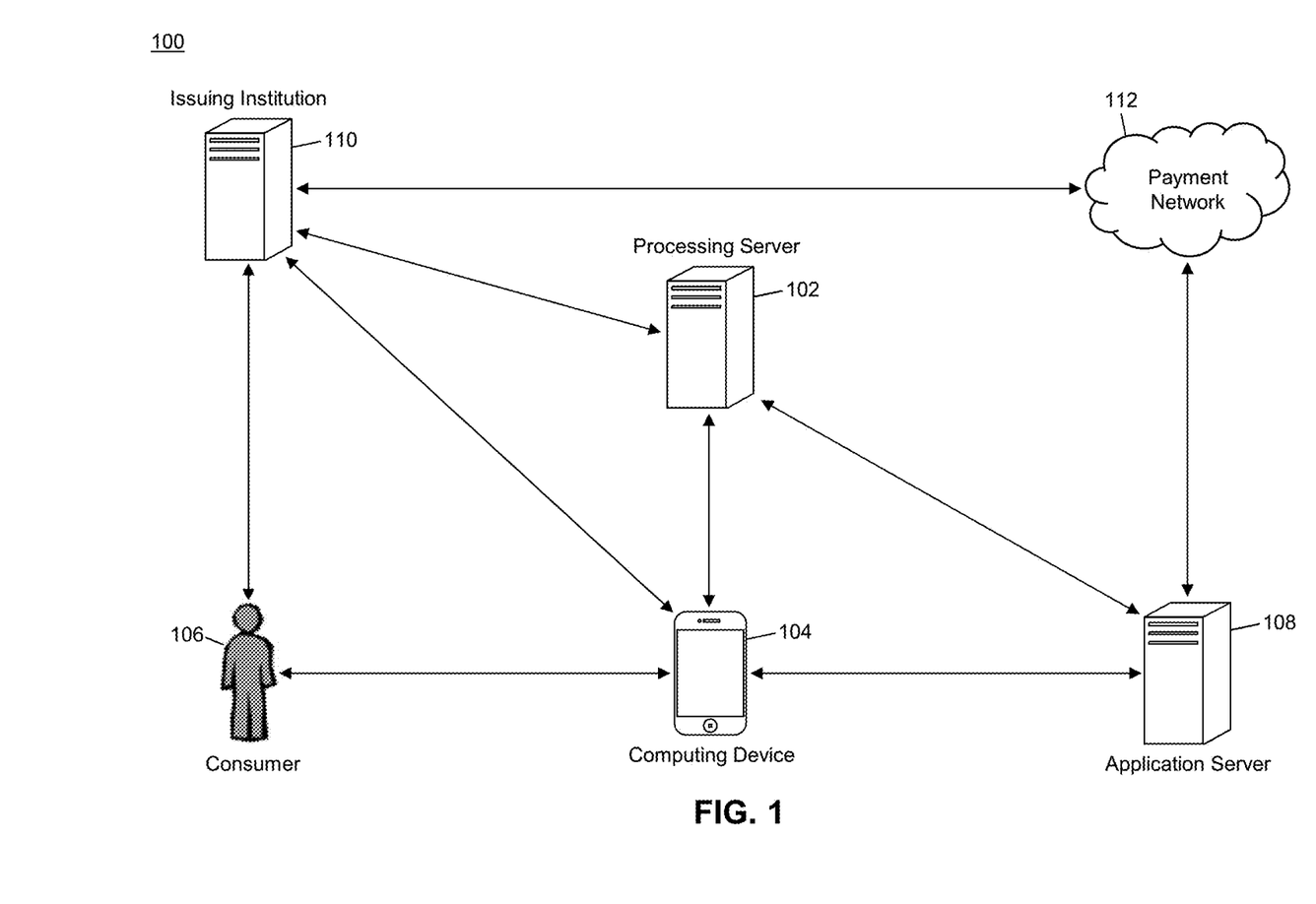
FIG. 1 is a block diagram illustrating a high level system architecture for the intelligent routing of electronic wallet registration and selection in accordance with exemplary embodiments.

FIG. 1 illustrates a system 100 for the intelligent routing of electronic wallets for registration and selection.

The system 100 may include a processing server 102. The processing server 102, discussed in more detail below, may be configured to use intelligent routing for use in the registration and selection of an electronic wallet. The system 100 may include a computing device 104 that is configured to enable a consumer 106 to access and use an electronic wallet as a user of the computing device 104. The computing device 104 may be any type of computing device suitable for performing the functions discussed herein, such as desktop computer, laptop computer, notebook computer, tablet computer, cellular phone, smart phone, smart watch, wearable computing device, implantable computing device, etc. The computing device 104 may be configured to execute an application program associated with a plurality of electronic wallets.

In one embodiment, the application program may be a dedicated application program that is associated with the plurality of electronic wallets for usage thereof. In another embodiment, the application program may be a web browsing application program that navigates to a web page that is associated with the plurality of electronic wallets for usage thereof. In any instance, the application program (e.g., or web page navigated to by the application program) may be associated with an application server 108. The application program may electronically communicate with the application server 108 using a suitable communication network and method, such as via a cellular communication network, the Internet, etc. The application server 108 may provide data to the computing device 104 for usage of the application program. In some embodiments, the application server 108 may solely provide data to the computing device 104 during an installation process, which may be used during execution of the application program. In other embodiments, the computing device 104 may communicate with the application server 108 during execution of the application program for the receipt and usage of additional data.

For registration of an electronic wallet, the consumer 106 may be presented with a registration screen or page via the application program as executed by the computing device 104. In some embodiments, the registration screen may be prompted via one or more actions taken by the consumer 106, such as during the process of initiating a payment transaction with a merchant. For example, the consumer 106 may be visiting the merchant's web site and select products for purchase, then, during the checkout process, may select to initiate registration with an electronic wallet as part of the selection of the payment type used to fund the payment transaction. As part of the registration screen, the consumer 106 may be prompted to supply a primary account number for a transaction account associated with the consumer 106.

The transaction account may be issued to the consumer 106 by an issuing institution 110. The issuing institution 110 may be a financial institution, such as an issuing bank, configured to issue transaction accounts to consumers 106 for use in funding electronic payment transactions. As part of the issuing of the transaction account, the issuing institution 110 may provide the consumer 106 with at least a primary account number corresponding to the transaction account. In some instances, the consumer 106 may also be supplied with additional data that may be used in the usage of the transaction account or registration thereof with an electronic wallet, such as an expiration date, security code, etc. The consumer 106 may receive the primary account number and may supply the primary account number to the computing device 104 for electronic transmission as part of the registration process.

The processing server 102 may receive the primary account number. In some embodiments, the computing device 104 may electronically transmit the primary account number to the application server 108, which may forward the primary account number via an electronic transmission therefrom to the processing server 102 using a suitable communication network and method. In other embodiments, the computing device 104 may electronically transmit the primary account number directly to the processing server 102 via a suitable communication network and method. In some instances, the primary account number may be encrypted or otherwise protected prior to electronic transmission, and may be decrypted upon receipt by the processing server 102.

The processing server 102 may then, using the primary account number, identify an electronic wallet that is suitable for use of the corresponding transaction account. The suitable electronic wallet may be identified based on data parsed from the primary account number itself, such as a bank identification number (BIN) or issuer identification number (IIN), or from the full primary account number. For instance, each issuing institution 110 may electronically transmit at least one or more BINs, IINs, or primary account numbers, or a range of primary account numbers, to the processing server 102, along with information identifying an electronic wallet that may be used therewith. The information identifying the electronic wallet may be comprised of a wallet identifier, which may be a unique value associated with the respective electronic wallet, such as an identification number, name, etc. The processing server 102 may thus use the primary account number or data included therein to identify a wallet identifier for an electronic wallet that may be suitable for use with the consumer's issued transaction account.

The processing server 102 may then provide at least the wallet identifier for the routing of the computing device 104 to a proper registration page for the identified electronic wallet. In one embodiment, the processing server 102 may provide the wallet identifier to the computing device 104 or application server 108, which may then redirect the registration page to a registration page associated with the identified electronic wallet. In another embodiment, the processing server 102 may provide the web page or application data associated with the identified electronic wallet directly to the computing device 104. The consumer 106 may then be presented with registration with an electronic wallet that is directly associated with their transaction account without the need to select the electronic wallet from a plurality of different electronic wallets that may be managed by or usable with the application program.

The consumer 106 may then proceed with the registration process using the computing device 104. The registration process may include the providing, by the consumer 106, of at least one piece of identifying information, referred to herein as an account identifier. The account identifier may be a unique value associated with the consumer 106 for identification thereof, such as an email address, telephone number, username, etc. The computing device 104 may electronically transmit the account identifier (e.g., via the application server 108, if applicable) to the processing server 102. The processing server 102 may receive the account identifier and may generate a profile for the consumer 106 in an account database of the processing server 102, discussed in more detail below. The account profile may include at least the account identifier and the wallet identifier for the identified electronic wallet.

The consumer 106 may then use the transaction account in a payment transaction with a merchant via the application program. For future transactions, the consumer 106 may skip the registration phase and may directly supply their account identifier to the computing device 104, for electronic transmission to the processing server 102 (e.g., via the application server 108, if applicable). The processing server 102 may then identify the account profile for the consumer 106 using the account identifier, and then identify the wallet identifier included therein. The processing server 102 may then return the wallet identifier or data associated therewith to the application server 108 and/or computing device 104. The data associated therewith may be web page data or application data that comprises or is used in the identification or generation of data for presenting the associated electronic wallet to the consumer 106 for payment of the payment transaction. In some instances, the data associated therewith may be a uniform resource locator for a web page associated with the identified electronic wallet. The consumer 106 may then use the electronic wallet to fund the payment transaction using traditional methods and systems that will be apparent to persons having skill in the relevant art.

As part of the funding of the payment transaction, the application server 108 may electronically forward payment credentials for the transaction account to a payment network 112. The payment credentials may include the primary account number and any additional data associated therewith, such as an expiration date and/or security code. In some embodiments, the payment credentials may be electronically transmitted to the payment network 112 from the processing server 102. For instance, the payment credentials may be stored in the account profile associated with the consumer 106 and electronically transmitted upon usage of the account identifier. In an exemplary embodiment, payment credentials may be electronically transmitted to a system associated with a merchant, such as a point of sale system, which may transmit the payment credentials to the payment network 112 directly or via one or more intermediate entities, such as an acquiring financial institution or gateway processor. The payment network 112 may then process the payment transaction using traditional methods and systems.

The methods and systems discussed herein may thus enable a consumer 106 to register and use an electronic wallet without having to manually select the electronic wallet that is to be registered and used when presented with a plurality of different choices. The intelligent routing as performed by the processing server 102 may enable the consumer 106 to provide only their primary account number during registration and be automatically routed to an applicable electronic wallet during registration, and to provide only an account identifier during the initiation of a payment transaction to be automatically routed to the applicable electronic wallet for transmission of their payment credentials. As a result, there may be a significant increase in consumer convenience, which may result in a significantly higher registration and usage rate for electronic wallets, without the need for issuing institutions 110 to modify their electronic wallets and management thereof.

Processing Server

Figure 2:
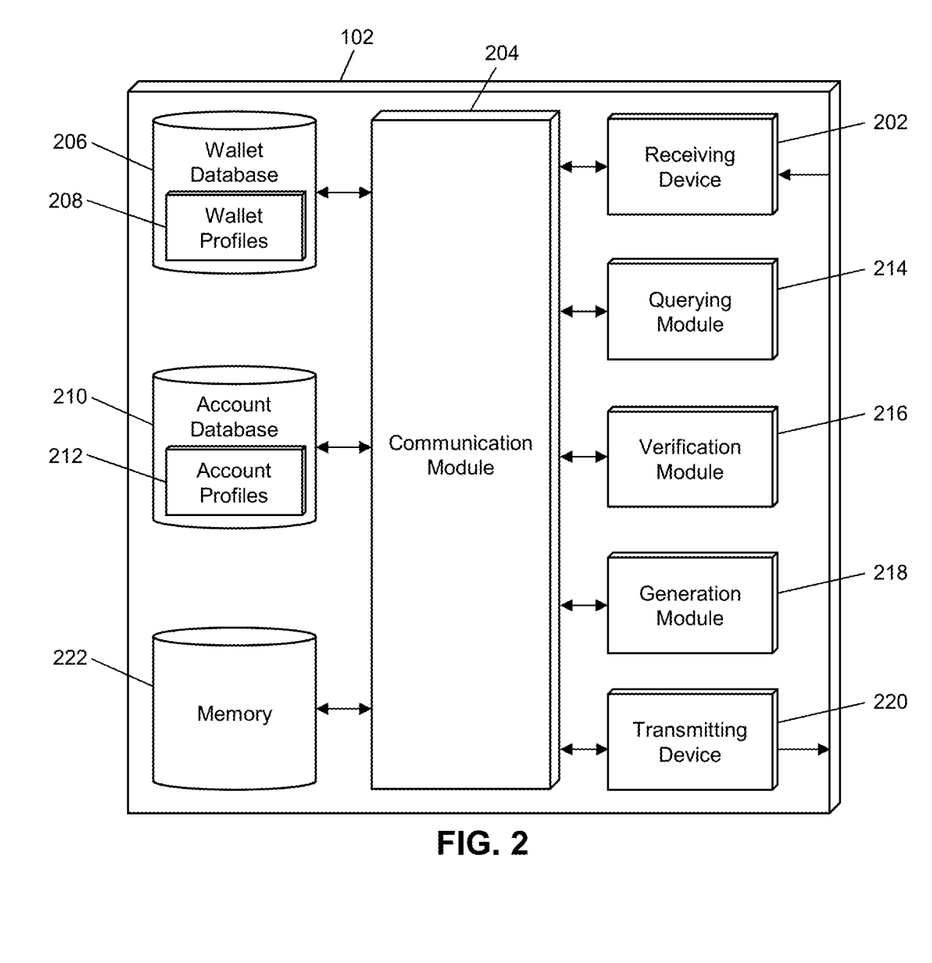
FIG. 2 is a block diagram illustrating the processing server of FIG. 1 for the intelligent routing of electronic wallet registration and selection in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data from computing devices 104, application servers 108, issuing institutions 110, and other entities via one or more communication networks, such as local area networks, cellular communication networks, the Internet, etc. In some embodiments, the receiving device 202 may be comprised of multiple devices, such as different receiving devices for receiving data over different networks, such as a first receiving device for receiving data over a local area network and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104 and application servers 108 that are superimposed or otherwise encoded with primary account numbers and other data associated with payment credentials, for use in intelligent routing during registration. The receiving device 202 may also be configured to receive data signals electronically transmitted by computing devices 104 and application servers 108 superimposed or otherwise encoded with account identifiers, for use in intelligent routing during selection of an electronic wallet during initiation of a payment transaction. The receiving device 202 may further be configured to receive data signals electronically transmitted by issuing institutions 110, which may be superimposed or encoded with BINs, IINs, primary account numbers, or data associated therewith, and wallet identifiers for use in associating transaction accounts with electronic wallets.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, calculation module 216, generation module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a wallet database 206. The wallet database 206 may be configured to store a plurality of wallet profiles 208 using a suitable data storage format and schema. The wallet database 206 may be a relational database that utilizes structured query language for the storage, identification, modifying, updating, accessing, etc. of structured data sets stored therein. Each wallet profile 208 may be a structured data set configured to store data related to an electronic wallet. Each wallet profile 208 may include at least one or more identification numbers and one or more wallet identifiers. Each of the wallet identifiers may be a unique value associated with the related electronic wallet or another electronic wallet associated therewith, for identification thereof. The one or more identification numbers may include IINs, BINs, primary account numbers, or ranges thereof.

The processing server 102 may also include an account database 210. The account database 210 may be configured to store a plurality of account profiles 212 using a suitable data storage format and schema. The account database 210 may be a relational database that utilizes structured query language for the storage, identification, modifying, updating, accessing, etc. of structured data sets stored therein. Each account profile 212 may be a structured data set configured to store data related to a consumer 106. Each account profile 212 may include at least an account identifier and one or more wallet identifiers. The account identifier may be a unique value associated with the consumer 106 for identification thereof. The wallet identifiers may be associated with an electronic wallet registered with by the related consumer 106.

The processing server 102 may include a querying module 214. The querying module 214 may be configured to execute queries on databases to identify information. The querying module 214 may receive one or more data values or query strings, and may execute a query string based thereon on an indicated database, such as the wallet database 206, to identify information stored therein. The querying module 214 may then output the identified information to an appropriate engine or module of the processing server 102 as necessary. The querying module 214 may, for example, execute a query on the wallet database 206 to identify a wallet profile 208 related to an electronic wallet associated with a consumer 106 based on a correspondence between a primary account number provided by the consumer 106 (e.g., received via the receiving unit 202) and the identification numbers included in the wallet profile 208. The querying module 214 may execute queries on the account database 210 to identify an account profile 212 associated with a consumer 106 during selection of an electronic wallet based on inclusion of an account identifier supplied by the consumer 106 (e.g., received via the receiving unit 202).

The processing server 102 may also include a verification module 216. The verification module 216 may be configured to perform verifications for the processing server 102 for performing the functions discussed herein. The verification module 216 may receive data for verification thereof as input, and may output a result of the verification to another module or engine of the processing server 102. The verification module 216 may, for example, be configured to verify primary account numbers and other data associated with a transaction account prior to registration of the transaction account in an account profile 212. Such verification may include, for example, verifying a primary account number as genuine, or verifying that data accompanying a primary account number, such as an expiration date, are correct.

The processing server 102 may also include a generation module 218. The generation module 218 may be configured to generate data for use in performing the functions of the processing server 102 discussed herein. The generation module 218 may receive an instruction as input, may generate data based on the instruction, and may output the generated data to another module or engine of the processing server 102. In some instances, the generation module 218 may also receive data as input, which may be used in the generation, and may also be configured to identify data for use in the generation, such as by generating instructions for execution by the querying module 214. The generation module 218 may be configured to, for example, generate data messages for electronic transmission to other entities and systems in the system 100, such as to the computing device 104 and/or application server 108, such as may include wallet identifiers, web page data, application data, etc.

The processing server 102 may also include a transmitting device 220. The transmitting device 220 may be configured to transmit data over one or more networks via one or more network protocols. In some embodiments, the transmitting device 220 may be configured to transmit data to computing devices 104, application servers 108, issuing institutions 110, and other entities via one or more networks, such as local area networks, cellular communication networks, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to computing devices 104 and/or application servers 108 that are superimposed or otherwise encoded with wallet identifiers and/or additional data associated with an electronic wallet, such as web page or application program data. The transmitting device 220 may electronically transmit data signals superimposed or encoded with data requests to issuing institutions 110, which may request data for use in including in wallet profiles 208 for the identification of electronic wallets based on provided primary account numbers.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Process for Registration with an Electronic Wallet

Figure 3:
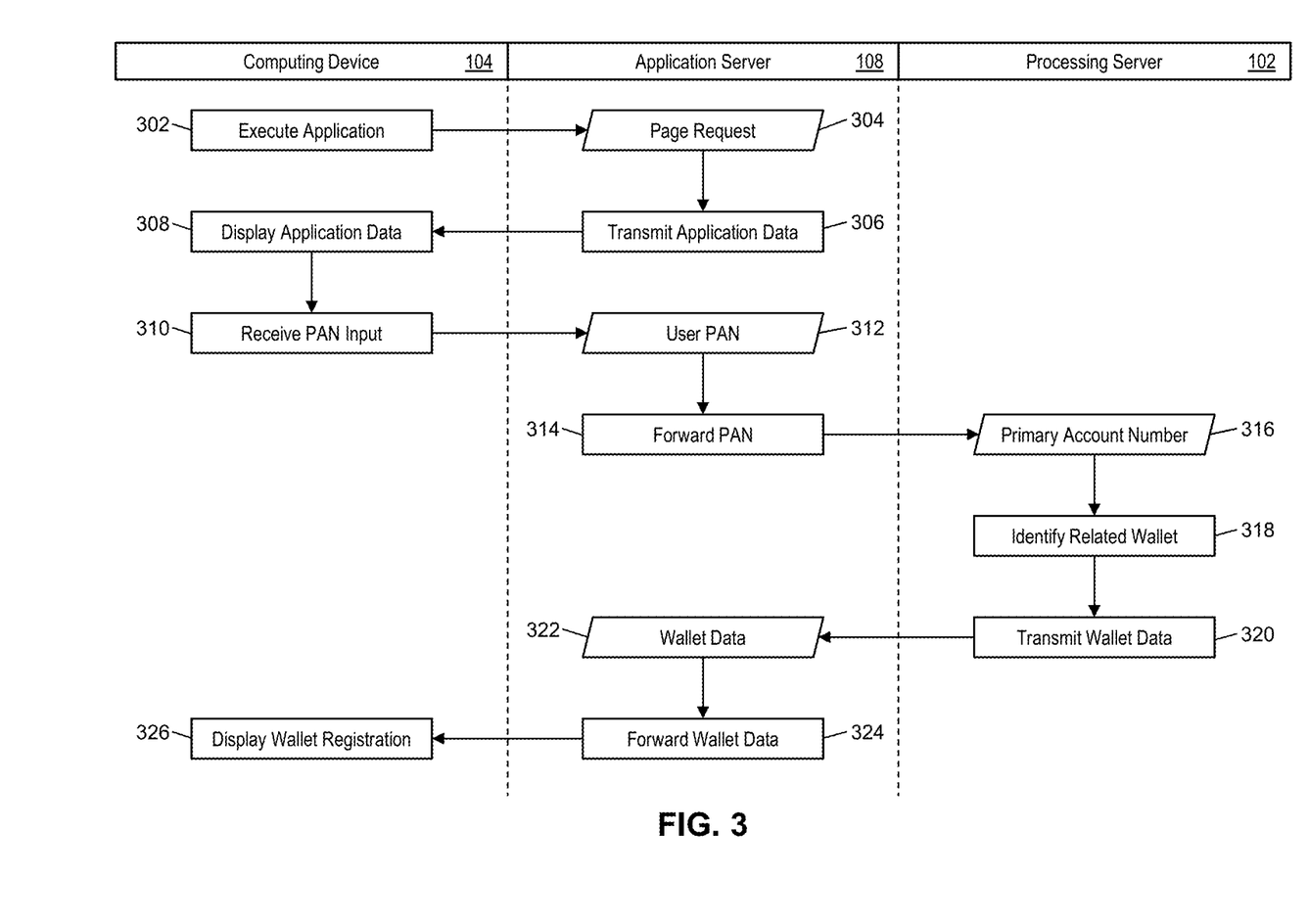
FIG. 3 is a flow diagram illustrating a process for the registration of an electronic wallet using intelligent routing using the system of FIG. 1 in accordance with exemplary embodiments.

FIG. 3 illustrates a process 300 for the intelligent routing of a user for registration with an electronic wallet for use in funding electronic payment transactions.

In step 302, the computing device 104 may execute an application program. In some embodiments, the application program may be an electronic wallet application program associated with a plurality of electronic wallets for use thereof in funding electronic payment transactions. In other embodiments, the application program may be a web browsing application program configured to navigate to a web page associated with a plurality of electronic wallets for use thereof. As part of the execution of the application program, the computing device 104 may electronically transmit a page request to the application server 108. In step 304, the application server 108 may receive the page request, which may be a request for a web page or application data associated with registration of an electronic wallet.

In step 306, the application server 108 may transmit the web page data or application data back to the computing device 104. In step 308, the computing device 104 may receive the application data and may display it to the consumer 106 using a suitable display device, such as a liquid crystal display or capacitive touch display. The application data may include a prompt for entry of a primary account number (PAN) for use in the intelligent routing of the consumer 106 to an electronic wallet for registration. In step 310, the computing device 104 may receive a PAN input by the consumer 106 as a user of the computing device 104, which may be electronically transmitted to the application server 108.

In step 312, the application server 108 may receive the user PAN from the computing device 104. In step 314, the application server 108 may forward the user PAN to the processing server 102 via an electronic transmission using a suitable communication network and method. In step 316, the receiving device 202 of the processing server 102 may receive the PAN. In step 318, the querying module 214 of the processing server 102 may execute a query on the wallet database 206 to identify a wallet profile 208 where the PAN corresponds to one of the included identification numbers. In step 320, the transmitting device 220 of the processing server 102 may electronically transmit at least the wallet identifier included in the identified wallet profile 208 to the application server 108.

In step 322, the application server 108 may receive the wallet identifier and any other wallet data associated therewith from the processing server 102. The additional data may include, for example, web page data or application data for display to the consumer 106, such as branding, images, product names and descriptions, etc. In step 324, the application server 108 may forward wallet data associated with the electronic wallet indicated via the wallet identifier to the computing device 104. In instances where the processing server 102 may not provide wallet data, the application server 108 may identify the wallet data using the received wallet identifier. In step 326, the computing device 104 may receive the wallet data and may display a page for registration with the identified electronic wallet to the consumer 106.

Process for Selection of an Electronic Wallet

Figure 4:
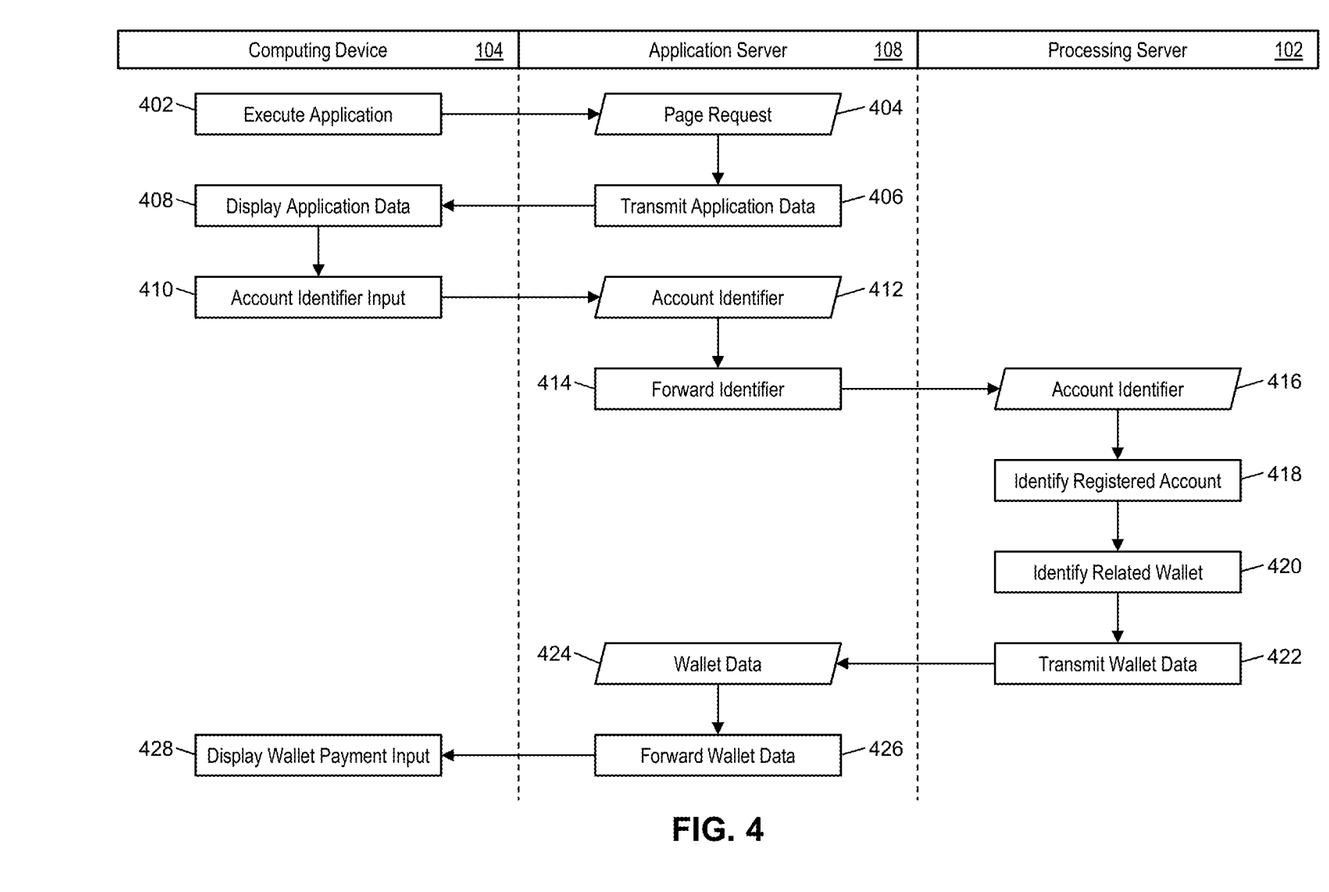
FIG. 4 is a flow diagram illustrating a process for the selection of an electronic wallet using intelligent routing using the system of FIG. 1 in accordance with exemplary embodiments.

FIG. 4 illustrates a process 400 for the intelligent routing of a user for selection of an electronic wallet for use in funding electronic payment transactions.

In step 402, the computing device 104 may execute an application program. In some embodiments, the application program may be an electronic wallet application program associated with a plurality of electronic wallets for use thereof in funding electronic payment transactions. In other embodiments, the application program may be a web browsing application program configured to navigate to a web page associated with a plurality of electronic wallets for use thereof. As part of the execution of the application program, the computing device 104 may electronically transmit a page request to the application server 108. In step 404, the application server 108 may receive the page request, which may be a request for a web page or application data associated with selection of an electronic wallet for use in funding an electronic payment transaction.

In step 406, the application server 108 may transmit the web page data or application data back to the computing device 104. In step 408, the computing device 104 may receive the application data and may display it to the consumer 106 using a suitable display device, such as a liquid crystal display or capacitive touch display. The application data may include a prompt for entry of an account identifier, such as a username, email address, telephone number, etc., for use in the intelligent routing of the consumer 106 to an electronic wallet for use in funding an electronic payment transaction. In step 410, the computing device 104 may receive an account identifier input by the consumer 106 as a user of the computing device 104, which may be electronically transmitted to the application server 108.

In step 412, the application server 108 may receive the account identifier from the computing device 104. In step 414, the application server 108 may forward the account identifier to the processing server 102 via an electronic transmission using a suitable communication network and method. In step 416, the receiving device 202 of the processing server 102 may receive the account identifier. In step 418, the querying module 214 of the processing server 102 may execute a query on the account database 210 of the processing server 102 to identify an account profile 212 that includes the supplied account identifier. In step 420, the processing server 102 may identify an electronic wallet registered by the consumer 106, based on the wallet identifier included in the identified account profile 212. In step 422, the transmitting device 220 of the processing server 102 may electronically transmit at least the identified wallet identifier to the application server 108.

In step 424, the application server 108 may receive the wallet identifier and any other wallet data associated therewith from the processing server 102. The additional data may include, for example, web page data or application data for display to the consumer 106, such as branding, images, product names and descriptions, etc. In step 426, the application server 108 may forward wallet data associated with the electronic wallet indicated via the wallet identifier to the computing device 104. In instances where the processing server 102 may not provide wallet data, the application server 108 may identify the wallet data using the received wallet identifier. In step 428, the computing device 104 may receive the wallet data and may display a page related the identified electronic wallet to the consumer 106 for submission of payment credentials for use in funding an electronic payment transaction.

Exemplary Method for Intelligent Routing for Electronic Wallet Registration

Figure 5:
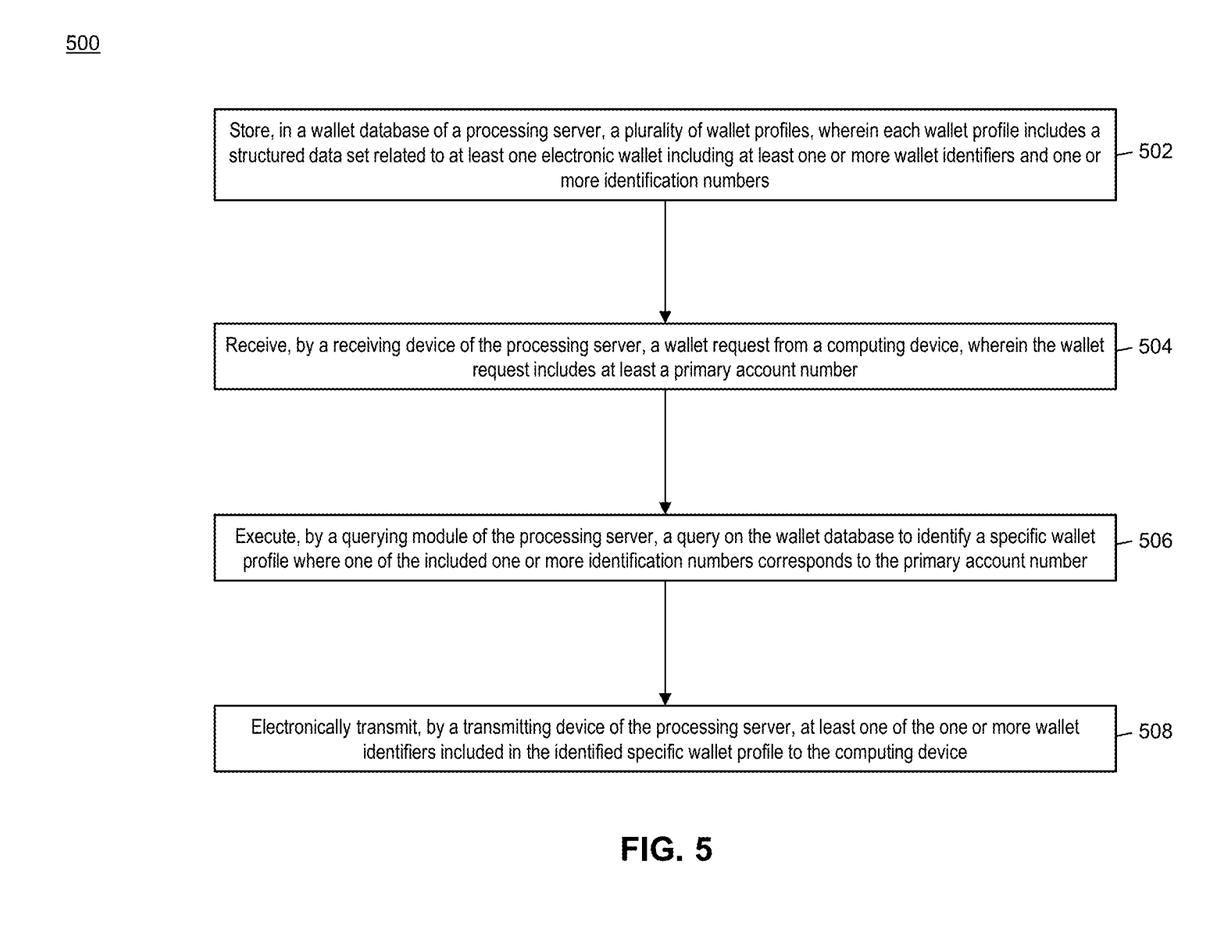
FIG. 5 is a flow chart illustrating an exemplary method for intelligent routing for electronic wallet registration in accordance with exemplary embodiments.

FIG. 5 illustrates a method 500 for the intelligent routing of a user to an associated electronic wallet among a plurality of different electronic wallets for registration thereof.

In step 502, a plurality of wallet profiles (e.g., wallet profiles 208) may be stored in a wallet database (e.g., the wallet database 206) of a processing server (e.g., the processing server 102), wherein each wallet profile includes a structured data set related to at least one electronic wallet including at least one or more wallet identifiers and one or more identification numbers. In step 504, a wallet request may be received by a receiving device (e.g., the receiving device 202) of the processing server from a computing device (e.g., the computing device 104 or application server 108), wherein the wallet request includes at least a primary account number.

In step 506, a query may be executed on the wallet database by a querying module (e.g., the querying module 214) of the processing server to identify a specific wallet profile where one of the included one or more identification numbers corresponds to the primary account number. In step 508, at least one of the one or more wallet identifiers included in the identified specific wallet profile may be electronically transmitted by a transmitting device (e.g., the transmitting device 220) of the processing server to the computing device.

In one embodiment, each wallet profile may further include web page data associated with registration of the related at least one electronic wallet, and electronically transmitting the at least one wallet identifier may include electronically transmitting the web page data included in the identified specific wallet profile. In some embodiments, the one or more wallet identifiers may be one of: bank identification numbers and issuer identification numbers, and the primary account number may include the one of the included one or more identification numbers. In one embodiment, the method 500 may also include verifying, by a verification module (e.g., the verification module 216) of the processing server, the primary account number as a valid transaction account number. In a further embodiment, the wallet request may further include an expiration date and a security code, and verification of the primary account number may be based on at least the primary account number, expiration date, and security code.

In some embodiments, the method 500 may further include executing, by the querying module of the processing server, a query on an account database (e.g., the account database 210) of the processing server to insert an account profile (e.g., an account profile 212) in the account database, wherein the account profile includes a structured data set related to a user account including at least the one of the one or more wallet identifiers and an account identifier. In a further embodiment, the account identifier may be included in the wallet request. In another further embodiment, the method 500 may even further include receiving, by the receiving device of the processing server, registration data from the computing device, wherein the registration data includes at least the account identifier.

Exemplary Method for Intelligent Routing for Electronic Wallet Selection

Figure 6:
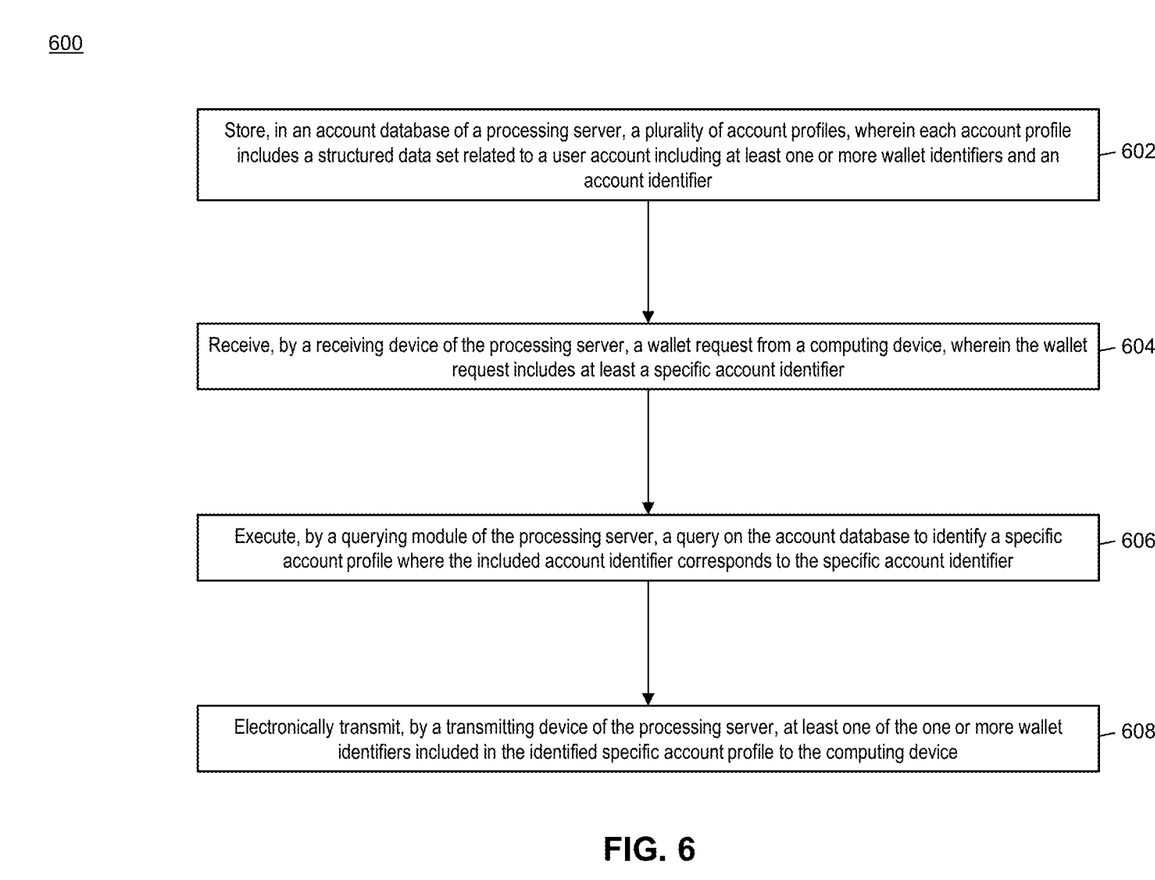
FIG. 6 is a flow chart illustrating an exemplary method for intelligent routing for electronic wallet selection in accordance with exemplary embodiments.

FIG. 6 illustrates a method 600 for the intelligent routing of a user to an registered electronic wallet for use in funding an electronic payment transaction.

In step 602, a plurality of account profiles (e.g., the account profiles 212) may be stored in an account database (e.g., the account database 210) of a processing server (e.g., the processing server 102), wherein each account profile includes a structured data set related to a user account including at least one or more wallet identifiers and an account identifier. In step 604, a wallet request may be received by a receiving device (e.g., the receiving device 202) of the processing server from a computing device (e.g., the computing device 104 or application server 108), wherein the wallet request includes at least a specific account identifier.

In step 606, a query may be executed on the account database by a querying module (e.g., the querying module 214) of the processing server to identify a specific account profile where the included account identifier corresponds to the specific account identifier. In step 608, at least one of the one or more wallet identifiers included in the identified specific account profile may be electronically transmitted by a transmitting device (e.g., the transmitting device 220) of the processing server to the computing device.

In one embodiment, the method 600 may further include storing, in a wallet database (e.g., the wallet database 206) of the processing server, a plurality of wallet profiles (e.g., wallet profiles 208), wherein each wallet profile includes a structured data set related to at least one electronic wallet including at least one or more wallet identifiers and one or more identification numbers. In a further embodiment, the method 600 may even further include executing, by the querying module of the processing server, a query on the wallet database to identify a specific wallet profile where one of the included one or more wallet identifiers corresponds to one of the one or more wallet identifiers included in the identified specific account profile, wherein each wallet profile further includes web page data associated with registration of the related at least one electronic wallet, and electronically transmitting the at least one wallet identifier includes electronically transmitting the web page data included in the identified specific wallet profile.

In some embodiments, each account profile may further include payment credentials, and electronically transmitting at least one of the one or more wallet identifiers may include electronically transmitting the payment credentials included in the identified specific account profile. In a further embodiment, the wallet request may further include a merchant identifier; and the payment credentials may be electronically transmitted to a computing system associated with the merchant identifier. In one embodiment, the account identifier may be one of: an email address and phone number.

Computer System Architecture

Figure 7:
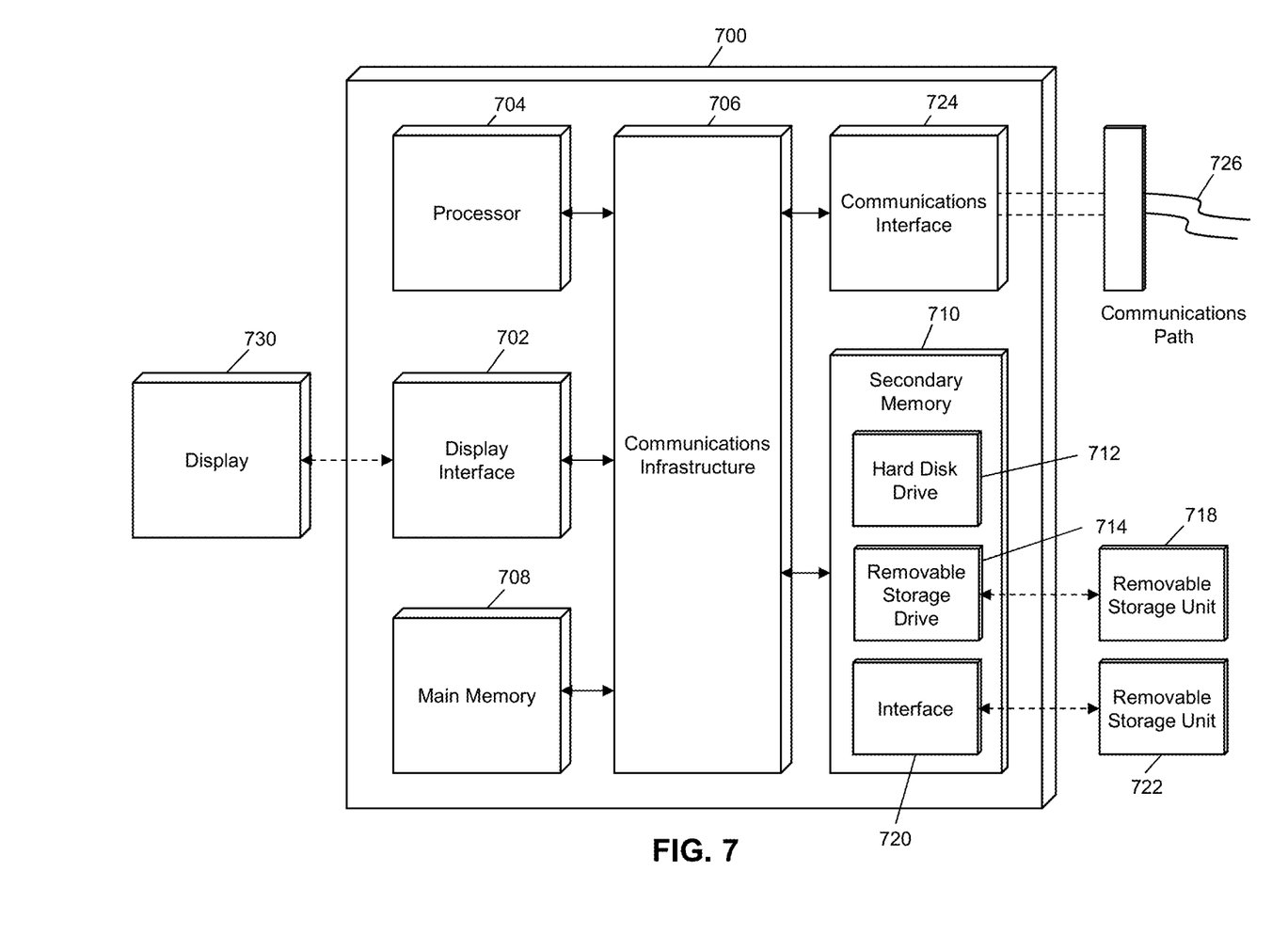
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for intelligent routing for electronic wallet registration and selection. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for intelligent routing for electronic wallet registration, comprising:

communicating, by a processing server, with a plurality of issuing institutions, and receiving from each issuing institution, from the plurality of issuing institutions, (i) a plurality of identification numbers including bank identification numbers (BINs), issuing institution numbers (IINs), or primary account numbers, and (ii) information identifying electronic wallets for use therewith including wallet identifiers;

storing, in a wallet database of the processing server, a plurality of wallet profiles, wherein each wallet profile is related to at least one electronic wallet including at least one or more wallet identifiers and one or more identification numbers received from an issuing institution;

receiving, by a receiving device of the processing server, a wallet request from a computing device, wherein the wallet request includes at least a primary account number associated with a transaction account and requests initiation of registration with an electronic wallet;

executing, by a processing device of the processing server, a query on the wallet database and identifying a specific wallet profile of an electronic wallet that is suitable for the transaction account based on data parsed from the primary account number that corresponds to one or more identification numbers included in the specific wallet profile;

electronically transmitting, by a transmitting device of the processing server, at least one of the one or more wallet identifiers included in the identified specific wallet profile to the computing device prompting automatic routing to a registration page associated with the suitable electronic wallet for registration therewith.

2. The method of claim 1, wherein
each wallet profile further includes web page data associated with registration of the related at least one electronic wallet, and
electronically transmitting the at least one wallet identifier includes electronically transmitting the web page data included in the identified specific wallet profile.

3. The method of claim 1, further comprising:
executing, by the processing device of the processing server, a query on an account database of the processing server to insert an account profile in the account database, wherein the account profile includes a structured data set related to a user account including at least the one of the one or more wallet identifiers and an account identifier.

4. The method of claim 3, wherein the account identifier is included in the wallet request.

5. The method of claim 3, further comprising:
receiving, by the receiving device of the processing server, registration data from the computing device, wherein the registration data includes at least the account identifier.

6. The method of claim 1, further comprising:
verifying, by a verification module of the processing server, the primary account number as a valid transaction account number.

7. The method of claim 6, wherein
the wallet request further includes an expiration date and a security code, and
verification of the primary account number is based on at least the primary account number, expiration date, and security code.

8. A method for intelligent routing for electronic wallet selection, comprising:
storing, in an account database of a processing server, a plurality of user account profiles, wherein each user account profile is related to a user account of a consumer and includes at least (i) one or more wallet identifiers associated with respective electronic wallets registered by the consumer, (ii) one or more uniform resource locators (URLs) associated with respective electronic wallets registered by the consumer, and (iii) an account identifier associated with the consumer;

receiving, by a receiving device of the processing server, a wallet request from a computing device, wherein the wallet request includes at least a specific account identifier associated with a specific consumer;

executing, by a processing device of the processing server, a query on the account database and identifying a specific account profile of the specific consumer based on a correspondence between the account identifier included in the specific account profile and the specific account identifier included in the received wallet request;

identifying, by the processing server, one or more specific wallet identifiers and one or more URLs included in the identified specific account profile, which are associated with respective one or more electronic wallets registered by the consumer; and electronically transmitting, by a transmitting device of the processing server, to the computing device, at least one of the one or more URLs associated with respective electronic wallets registered by the consumer and included in the identified specific account profile.

9. The method of claim 8, further comprising:
storing, in a wallet database of the processing server, a plurality of wallet profiles, wherein each wallet profile includes a structured data set related to at least one electronic wallet including at least one or more wallet identifiers and one or more identification numbers including bank identification numbers (BINs), issuing institution numbers (IINs), or primary account numbers.

10. The method of claim 8, wherein
each account profile further includes payment credentials, and
electronically transmitting at least one of the one or more URLs includes electronically transmitting the payment credentials included in the identified specific account profile.

11. The method of claim 10, wherein
the wallet request further includes a merchant identifier; and
the payment credentials are electronically transmitted to a computing system associated with the merchant identifier.

12. The method of claim 8, wherein the account identifier is one of: an email address and phone number.

13. A system for intelligent routing for electronic wallet registration, comprising:
a receiving device of a processing server configured to communicate with a plurality of issuing institutions, and receive from each issuing institution, from the plurality of issuing institutions, (i) a plurality of identification numbers including bank identification numbers (BINs), issuing institution numbers (IINs), or primary account numbers, and (ii) information identifying electronic wallets for use therewith including wallet identifiers; and a wallet database of the processing server configured to store a plurality of wallet profiles, wherein each wallet profile is related to at least one electronic wallet including at least one or more wallet identifiers and one or more identification numbers received from an issuing institution;

wherein the receiving device of the processing server is further configured to receive a wallet request from a computing device, wherein the wallet request includes at least a primary account number associated with a transaction account and requests initiation of registration with an electronic wallet; and wherein the system further comprises:

a processing device of the processing server configured to execute a query on the wallet database to identify a specific wallet profile of an electronic wallet that is suitable for the transaction account based on data parsed from the primary account number that corresponds to included in the specific wallet profile; and a transmitting device of the processing server configured to electronically transmit, at least one of the one or more wallet identifiers included in the identified specific wallet profile to the computing device prompting automatic routing to a registration page associated with the suitable electronic wallet for registration therewith.

14. The system of claim 13, wherein each wallet profile further includes web page data associated with registration of the related at least one electronic wallet, and electronically transmitting the at least one wallet identifier includes electronically transmitting the web page data included in the identified specific wallet profile.

15. The system of claim 13, wherein the processing device of the processing server is further configured to execute a query on an account database of the processing server to insert an account profile in the account database, wherein the account profile includes a structured data set related to a user account including at least the one of the one or more wallet identifiers and an account identifier.

16. The system of claim 15, wherein the account identifier is included in the wallet request.

17. The system of claim 15, wherein the receiving device of the processing server, registration data from the computing device, wherein the registration data includes at least the account identifier.

18. The system of claim 13, further comprising:

a verification module of the processing server configured to verify the primary account number as a valid transaction account number.

19. The system of claim 14, wherein the wallet request further includes an expiration date and a security code, and verification of the primary account number is based on at least the primary account number, expiration date, and security code.

20. A system for intelligent routing for electronic wallet selection, comprising:

an account database of a processing server configured to store a plurality of user account profiles, wherein each user account profile is related to a user account of a consumer and includes at least (i) one or more wallet identifiers associated with respective electronic wallets registered by the consumer, (ii) one or more uniform resource locators (URLs) associated with respective electronic wallets registered by the consumer, and (iii) an account identifier associated with the consumer;

a receiving device of the processing server configured to receive a wallet request from a computing device, wherein the wallet request includes at least a specific account identifier associated with a specific consumer; and a processing device of the processing server configured to execute a query on the account database and to identify a specific account profile of the specific consumer based on a correspondence between the account identifier included in the specific account profile and the specific account identifier included in the received wallet request, wherein the processing server is configured to identify one or more specific wallet identifiers and one or more URLs included in the identified specific account profile, which are associated with respective one or more electronic wallets registered by the consumer, and wherein the system further comprises:

a transmitting device of the processing server configured to electronically transmit, to the computing device, at least one of the one or more URLs associated with respective electronic wallets registered by the consumer and included in the identified specific account profile.

21. The system of claim 20, further comprising:

a wallet database of the processing server configured to store a plurality of wallet profiles, wherein each wallet profile includes a structured data set related to at least one electronic wallet including at least one or more wallet identifiers and one or more identification numbers including bank identification numbers (BINs), issuing institution numbers (IINs), or primary account numbers.

22. The system of claim 20, wherein each account profile further includes payment credentials, and electronically transmitting at least one of the one or more wallet identifiers includes electronically transmitting the payment credentials included in the identified specific account profile.

23. The system of claim 22, wherein the wallet request further includes a merchant identifier; and the payment credentials are electronically transmitted to a computing system associated with the merchant identifier.

24. The system of claim 20, wherein the account identifier is one of: an email address and phone number.

* * * * *